Patented May 24, 1932

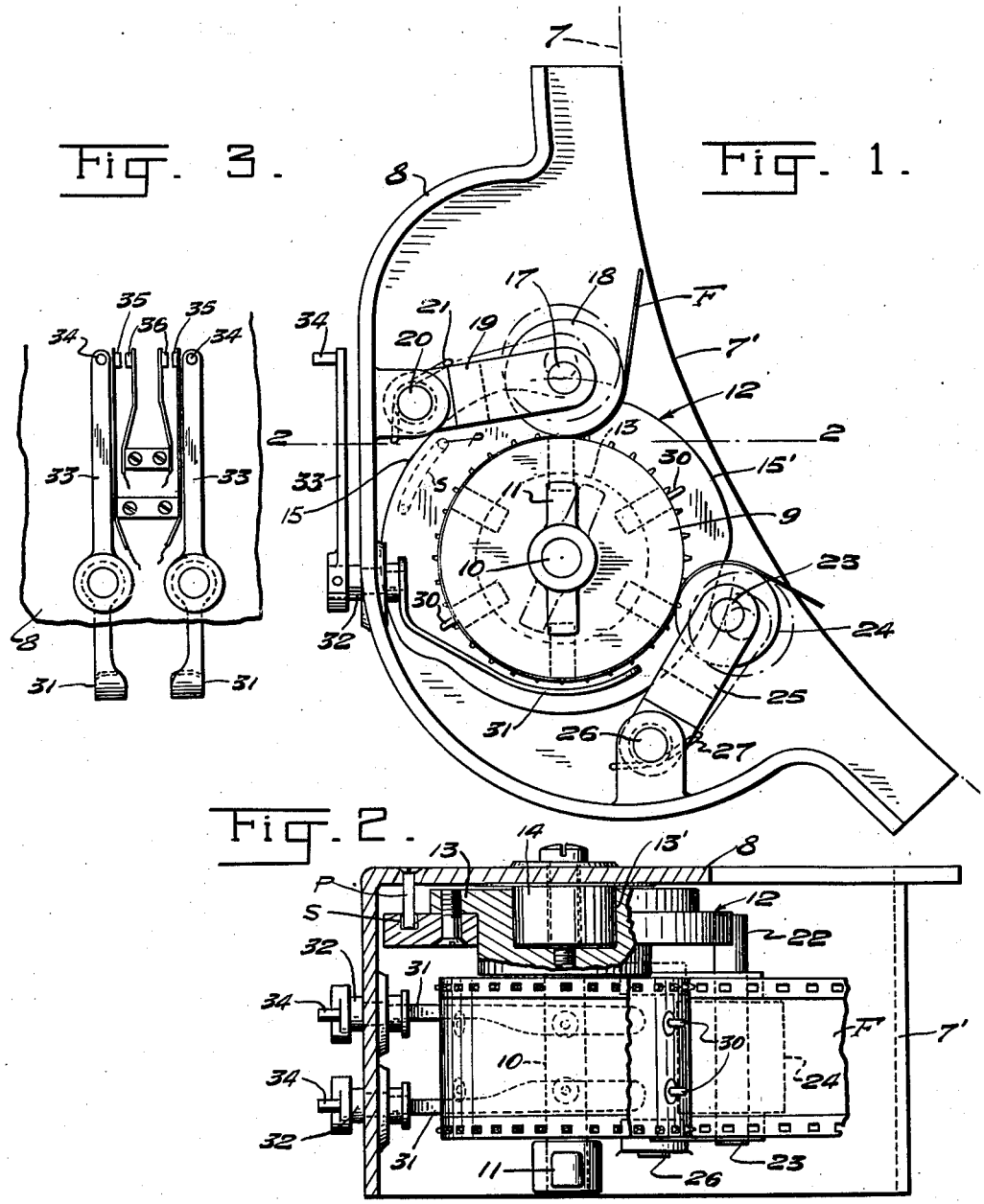

1,860,330

UNITED STATES PATENT OFFICE

HARRISON W. ROGERS, OF NEW YORK, N. Y., ASSIGNOR TO MAX A. SCHLESINGER, OF NEW YORK, N. Y.

FILM CONTROL AND GUIDING DEVICE FOR MOTION PICTURE PROJECTORS

Application filed October 20, 1928. Serial No. 313,776.

This invention relates to improvements in film guides for moving picture projectors, and is particularly adapted for use in electrical circuit-controlling means operated by the film to start and stop the motion of sound reproducing machines for synchronized pictures, one object of the invention being the provision of a simple device by means of which the film may be introduced and removed in an easy manner.

This invention is the outcome of the invention as set forth in my U. S. Patent No. 1,254,436, dated January 22, 1918, in which a rotary device is employed as a film guide and carries circuit-controlling means influenced by the film during the movement thereof, the present device utilizing the shaft of said film guide to be oscillated manually and operate a device which, in turn, causes the successive movement or disengagement of the coacting film guides from the main film guide and providing spaces at diametrically opposite points for the introduction of the film around the main film guide, springs being provided for moving the latter to film-engaging position when the main film guide is moved from the opposite direction.

Another object of this invention is the provision of an arrangement operated through the axle of the main film guide whereby the two film-engaging auxiliary guide rollers are successively moved into and out of engagement, thus providing a means that when the film is introduced upon the main film guide one of the auxiliary members will engage the film previous to the other so as to insure the proper fitting or inserting of the film.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of the claims without departing from the spirit of the invention.

In the accompanying drawings:—

Figure 1 is a side elevation of the complete device and a portion of the film casing of a motion picture projector.

Figure 2 is a cross section on line 2—2 of Figure 1.

Figure 3 is a view taken from the left of Figure 1 showing the electrical contacts or switches to be controlled by the film.

Referring to the drawings, the numeral 7 designates the film casing which is here shown as provided with an auxiliary casing 8 attached thereto and adjacent the opening 7' formed in said casing. The film F is adapted to be placed within the casing 8. In this casing 8 is mounted for rotation the main film guide roller 9 which, and through the shaft 10 and the thumb member 11, the member 13 may be manually oscillated so that its cam 12 carried by the member 13, fastened to the shaft 10. The member 13 is provided with a socket 13' rotatably mounted on the boss 14, and through it can be oscillated to move the long cam edge 15 upon one end 16 of the shaft 17 of the upper film-engaging roller 18, and thus cause the carrying frame 19 which is pivoted at 20 to be moved in opposition to the spring 21, thus producing a space between the roller 18 and 9 so that the film F can be inserted or withdrawn. At the same time, the lower cam edge 15' of the member 12 will engage the end 22 of the shaft 23 which carries the lower auxiliary film guide 24 mounted in the frame 25 and pivoted at 26 in the casing 8 and in opposition to its spring 27, this action taking place either before or after the separation of the roller 18 so that either one of these rollers as may be desired will engage or disengage the motion film-guiding roller 9 and thus the film therebetween, so that the disengaged portion of the film may be tightened upon the member 9 previous to the engagement of the next auxiliary film guide roller.

This feature is of very great importance in the introduction of the film as if the two rollers are brought into simultaneous contact there is often a buckle in the film that interferes with the proper movement thereof over the guide 9, and as this guide 9 is provided with a plurality of slidable switch-actuating members 30, it is essential that the film rest as closely upon the periphery thereof as is possible. As here shown, these members 30 are adapted to engage when passed through an opening of the film F either one of the pivoted arms 31 mounted upon the stems 32 and carrying its respective arm 33. Each of these arms 33 is provided with the contact closing member 34 mounted exteriorly of the casing 8 so that said normally open contacts 35 and 36 are closed at the proper time to, in turn, operate the starting mechanism for a sound reproducing machine (not shown), but as particularly described in my previous patent above referred to.

It is also apparent from this construction that the same is not necessarily limited to the film-controlling switch mechanism but may be applied to the other film-guiding members of a motion picture projector where it is desirable to thread or insert the film or remove the same in a rapid and thorough manner.

In order to limit the oscillation of the cam, and its shaft, a pin is mounted in the casing and projects into the curved slot, which is disposed concentric to the axis of the shaft 10.

I claim:—

1. In a motion picture projector, the combination of a rotary main film guide and two spring-held pivotally mounted co-acting film guides, and means controlled by the shaft of the main film guide for successively moving said auxiliary guides into and out of engagement with the main film guide, whereby one of the co-acting film guides contacts the main film guide ahead of the next co-acting film guide, and vice versa.

2. In a motion picture projector, the combination of a rotary main film guide and its shaft and two spring-held pivotally mounted co-acting film guides, said shaft being capable of oscillatory movement, and means controlled thereby and in engagement with the auxiliary film guides whereby when the shaft is moved in one direction, said coacting guides are successively moved away from the main film guide and when moved in the opposite direction are in the reverse order successively moved toward the film guide.

3. In a motion picture projector, the combination of a film guide including a main rotary film guiding member, two pivotally mounted auxiliary film guiding members coacting therewith, and a single manually operable means for successively moving the two auxiliary film guiding members into or out of co-action with the main film guide, the two pivotally mounted auxiliary film guiding members including two pivoted arms, a roller carried by each arm, and a spring pressing each arm to hold its roller in contact with the main film guiding member, and in which the manually operable means includes an oscillatory cam, against which the shafts of the rollers are resiliently held, the face of the cam being so shaped that as the cam is moved in one direction the rollers are successively moved out of contact with the main guiding member and against the action of the springs, movement in the opposite direction permits the springs to move the rollers in reverse succession and into contact with the main guiding member.

4. In a motion picture projector, the combination of a film guide including a main rotary film guiding member, two pivotally mounted auxiliary film guiding members coacting therewith, and a single manually operable means for successively moving the two auxiliary film guiding members into or out of co-action with the main film guide, the two pivotally mounted auxiliary film guiding members include two pivoted arms, a roller carried by each arm, and a spring pressing each arm to hold its roller in contact with the main film guiding member, and in which the manually operable means includes an oscillatory cam, against which the shafts of the rollers are resiliently held, the face of the cam being so shaped that when the cam is moved in one direction the rollers are successively moved out of contact with the main guiding member and against the action of the springs, and movement in the opposite direction permits the springs to move the rollers in reverse succession and into contact with the main guiding member, and cooperative means carried by the cam and in the path thereof for limiting the oscillatory movement of said cam.

5. In a film guiding mechanism for a motion picture projector, the combination of a supporting member, a rotatable shaft carried thereby, a main film guiding roller rotatably mounted upon said shaft, a cam attached to said shaft for movement therewith, manually operable means attached to said shaft for oscillating the cam, co-acting means carried by the cam and in the path thereof for limiting the oscillatory movement of the cam two spring actuated arms disposed to have their free ends moved toward the cam, a roller mounted in the free end of each arm and disposed to co-act with the main guiding roller to guide the film thereon and means carried by each arm and disposed to be held in contact by its springs with the periphery of the cam, whereby as the cam is oscillated in one direction the arms and rollers are moved away from the main film guiding roller and in opposition to the springs and when moved in the opposite direction are permitted to move toward the main film guiding roller.

6. In a film guiding mechanism as claimed in claim 5, and in which the periphery of the cam is so shaped that the rollers carried thereby are moved successively out of contact and into contact with the main film guiding roller.

In testimony whereof I have hereunto set my hand.

HARRISON W. ROGERS.